United States Patent
Lankreijer et al.

(10) Patent No.: US 11,275,538 B2
(45) Date of Patent: Mar. 15, 2022

(54) METHOD FOR OPERATING A PRINT SERVER FOR DIGITAL HIGH-CAPACITY PRINTING SYSTEMS, AND PRINT SERVER

(71) Applicant: Canon Production Printing Holding B.V., Venlo (NL)

(72) Inventors: Herman Lankreijer, Hofsingelding (DE); Armin Gnaedig, Poing (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 16/913,395

(22) Filed: Jun. 26, 2020

(65) Prior Publication Data

US 2020/0409613 A1    Dec. 31, 2020

(30) Foreign Application Priority Data

Jun. 28, 2019 (DE) .......................... 102019117538.0

(51) Int. Cl.
*G06F 3/12* (2006.01)
*G06K 15/02* (2006.01)

(52) U.S. Cl.
CPC ............ *G06F 3/122* (2013.01); *G06F 3/1224* (2013.01); *G06F 3/1263* (2013.01); *G06F 3/1268* (2013.01)

(58) Field of Classification Search
None
See application file for complete search history.

(56) References Cited

U.S. PATENT DOCUMENTS 10,303,404 B2    5/2019    Lankreijer
2003/0035672 A1    2/2003    Kidani et al.
2003/0208564 A1*    11/2003    Miyake ................... G06F 16/50 709/219
2011/0317220 A1*    12/2011    Ogura ................... G06F 3/1274 358/1.16
2013/0003105 A1*    1/2013    Yamada .................. G06F 3/122 358/1.14
2013/0258377 A1    10/2013    Armstrong et al.
2018/0173467 A1*    6/2018    Lankreijer ............ G06F 3/1282
2018/0173473 A1*    6/2018    Lankreijer ............ G06F 9/5011

FOREIGN PATENT DOCUMENTS

DE    102016125020 A1    6/2018
DE    102016125023 A1    6/2018

OTHER PUBLICATIONS

"Digital Printing, Technology and Printing Techniques of Océ Digital Printing Presses," Chapter 15, pp. 347-361, 9th Edition, Feb. 2005, ISBN 3-00-001081-5 (English-language Version).

* cited by examiner

*Primary Examiner* — Beniyam Menberu
(74) *Attorney, Agent, or Firm* — Schiff Hardin LLP

(57) ABSTRACT

In a method for operating the print server, a spooling priority print job is determined which, among the spooling print jobs, has the highest printing priority and has not yet been stored in the print data cache memory. A print job size of the spooling priority print job is determined. A free capacity of the print data cache memory is also determined. One or more print jobs that are not currently being printed from the print data cache memory are deleted until the free capacity of the print data cache memory is equal to or greater than the size of the spooling priority print job, where the printing priority of the print job to be deleted is lower than the printing priority of the spooling priority print job. The spooling priority print job is then loaded into the print data cache memory.

19 Claims, 4 Drawing Sheets

METHOD FOR OPERATING A PRINT SERVER FOR DIGITAL HIGH-CAPACITY PRINTING SYSTEMS, AND PRINT SERVER

CROSS REFERENCE TO RELATED APPLICATIONS

This patent application claims priority to German Patent Application No. 102019117538.0, filed Jun. 28, 2019, which is incorporated herein by reference in its entirety.

BACKGROUND

Field

The present disclosure relates to a method for operating a print server for digital high-capacity printing systems, and a corresponding print server.

Related Art

Print servers for high-capacity printing systems are described in Chapter 15 of the book "Digital Printing, Technology and Printing Techniques of Océ Digital Printing Presses", 9th Edition, February 2005, ISBN 3-00-001081-5. Schematically shown herein is the workflow of a method used in an Océ PRISMAproduction Document Output Management System for communication between two processes of a computer system for transmission of print data.

A method for operating a print server for digital high-capacity printing systems is described in DE 10 2016 125 023 A1, which method includes the following steps:
reading state parameters which describe system states, for example the utilization of a CPU, of a working memory, of a file system, of a network, and/or of a system interface, by means of a cumulative trigger,
triggering of filters to read additional state parameters which include process states of application processes executed at the print server, wherein the triggering is executed with a trigger logic depending on whether the system states detected with the cumulative trigger represent an extraordinary operating state.

From DE 10 2016 125 020 A1, a storage system for a print server arises that has a first logical hard drive and a second logical hard drive. A third mass storage medium is provided that serves to accommodate the operating system, application programs, control data, and trace data. The first logical hard drive serves to accommodate print data (PD), and the second logical hard drive serves to accommodate the print data already prepared for printing (R2P: Ready to Print). Print jobs (PD) arriving at the print server are written to the first logical hard drive. To implement a print data service, the print data are read from the first logical hard drive into the working memory, processed, and written to the first logical hard drive again. This is repeated for each print data service. The print jobs (PD) are hereby converted into print data ready for printing (R2P: Ready to Print). A print data service may, for example, convert the print data, supplement them with barcodes, adapt them to a defined layout, and/or check the content for completeness or syntax. Only print data already prepared for printing, which are referred to as ready-to-print print data in the following, are stored on the second logical hard drive. The ready-to-print print data may also be referred to as printable data. The second logical hard drive may also be referred to as a print data spooler in which the ready-to-print print data are cached.

Given print servers for digital high-capacity printing systems, it is enormously important that a print data stream can be continuously supplied to the printing apparatuses. If a print data stream requested by a printing apparatus could not be transmitted at the correct time, the printing apparatus would need to be halted. However, a printing apparatus for a high-capacity printing system cannot be halted without taking further measures. For example, the transport of the recording medium cannot be stopped at a same/particular spot, it must be gradually slowed down to come to a halt. Therefore, a sudden halting of the printing process leads to a significant waste of recording media, which is also referred to as spoilage. The same occurs when the recording media has to be accelerated back to the print speed again when data is available. The downtime of a printing apparatus additionally incurs significant production costs.

Therefore, in print servers this second logical hard drive or the print spooler is normally formed exclusively from a cache memory in which large data sets may be written quickly and from which large data sets may be read quickly. Since, as is generally known, the data set of print jobs is large and a plurality of print jobs must be stored simultaneously in such a print spooler, the capacity of the cache memory must be designed to be accordingly large. Cache memories are, however, significantly more technically complicated than conventional mass storage, and therefore are significantly more expensive.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
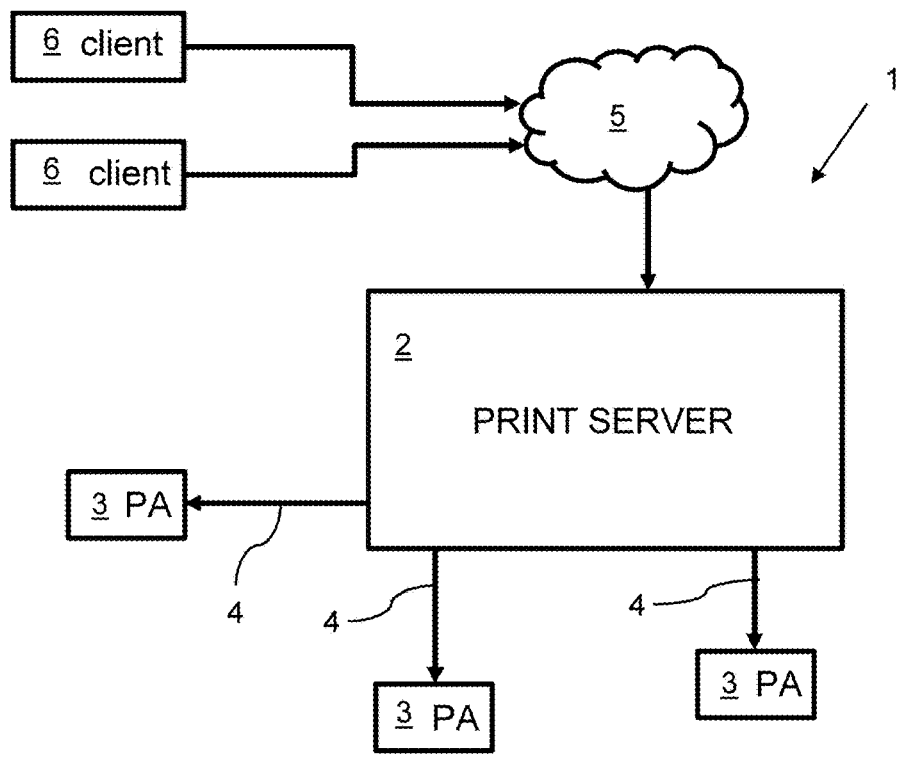
FIG. 1 illustrates a printing system having a print server according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide a method for operating a print server for digital high-capacity printing systems and a corresponding print server. Advantageously, the method allows a cache memory that is smaller in comparison to the prior art explained above to be used without hereby incurring losses in in the preparation of ready-to-print print data.

An additional object is to provide a method for operating a print server for digital high-capacity printing systems, and a corresponding print server, which advantageously allow a printing apparatus to quickly resume operation.

In a method according to an exemplary embodiment of the disclosure for operating a print server for digital high-capacity printing systems, a print server is used that has a spooling storage which is designed to store print jobs and a print data cache memory which is designed to transmit print data of a spooling print job to one or more printing apparatuses. A printing priority is associated with each print job stored in the spooling storage, referred to in the following as a spooling print job.

In this method according to an exemplary embodiment, the following steps are executed:
- determination of a spooling priority print job which has the highest printing priority among the spooling print jobs and is not stored in the print data cache memory,
- determination of the print job size of the spooling priority print job,
- determination of the free capacity of the print data cache memory,
- deletion of one or more print jobs in the print data cache memory that are not being printed, insofar as the free capacity of the print data cache memory is smaller than the size of the spooling priority print job, and insofar as the printing priority of the print job to be deleted is lower than the printing priority of the spooling priority print job, and
- loading of the spooling priority print job into the print data cache memory insofar as the free capacity is sufficient.

The printing priority is a comparative value. The printing priority determines what precedence a print job has in order to be printed out at the printing apparatus associated therewith.

A print job is a machine instruction to print print data. In addition to the print data, a print job may contain additional information and parameters such as, for example, size, parameters that describe the print quality, or printing priority. The print job may be associated with a printing apparatus.

The print data cache memory is a logical range of the cache memory medium. The cache memory medium comprises all print data cache memories. The cache memory medium may also have only a single print data cache memory.

Print data are content information of a print job. They may include texts, images, and/or vector information, for example tables. A print job may contain one or more files. A print job size is the size of a defined print job or of portions of the print job. The size describes how much storage space the associated print data take up. The print job size is calculated from a data parameter per allocation unit. The data parameter describes features of the contents of the print data, for example storage size, character count, word count, or number of page elements. The page elements form a contiguous portion of a print file, for example tables, images, or lists. Examples of a print job size are the total size in megabytes (MB), number of characters per side, or page size, which may be indicated in megabytes per DIN A4 page (MB/DIN A4 page). Other page formats are likewise possible, for example DIN A3, DIN A2.

With the method, both the spooling storage and the print data cache memory are used for spooling. The print jobs are read from the print data cache memory and transmitted to a printing apparatus. Since a cache memory allows the reading of data at a high data rate, the print data may be transmitted quickly to the printing apparatus in a continuous data stream. The printing apparatus is directly connected with the print server, so that the print data cache memory directly relays the print data to the printing apparatus. The data stream must always be delivered from the print server if the printing apparatus requests it or is ready to receive. If the printing process were to be interrupted, this leads to significant costs given a high-capacity printing system. A waste is created, also referred to as spoilage, with a paper web of from a few tens of meters to a few hundreds of meters. It may even prove to be necessary to print the print job anew from the beginning. The downtime of the printing apparatus additionally incurs significant costs. What is meant by the expression "continuous data stream" is thus a data stream that is continuously ready, thus ready without interruption, to be transmitted to the printing apparatus or apparatuses, but is not necessarily actually always transmitted continuously. If no print data are requested by the printing apparatus, the transmission of the print data may then also be interrupted. Given conventional print servers, such a waste is avoided in that the capacity of the print data cache memory is chosen to be very large. Such print data cache memories with large capacity are very expensive, in particular if only a cache memory is present which must be able to provide the maximum read speed of the fastest printing apparatus. Given conventional print servers, the print data cache memory is typically so large that all print jobs may be stored there.

By contrast, the method according to the exemplary embodiments of the disclosure enable print jobs which are already stored in the print data cache memory to be deleted again under defined conditions in order to achieve storage space in the print data cache memory for print jobs with higher printing priority that arrive later at the print server. It is hereby ensured that a print job with high printing priority does not need to be put on hold, and on the other hand the capacity of the print data cache memory does not need to be designed so small that only a few print jobs may be kept therein. In an exemplary embodiment, the print data cache memory has such a capacity that the printing operation may be implemented uninterrupted for all connected printing apparatuses. For example, the capacity is so large that a paper roll may be printed to with the print jobs in the print data cache memory. Via the method described above, it is then ensured that the paper roll is printed to without interruption.

In an exemplary embodiment, the required capacity of the print data cache memory G is calculated from the desired uninterrupted print duration t [min], the print speed of the printing apparatuses $V_D$ [pages/min], the page size $K_D$ [MB/page], and the average number of printed copies A, with the following formula:

$G=t*V_D*K_D/A.$

In the following, the required capacity for a first example is calculated. A paper roll should be printed to. The printing time of a paper roll is approximately 90 minutes. Four printing apparatuses are connected, each with 2000 DIN A4 pages per minute. Each DIN A4 page of the print job is 4 MB. 10 copies should be printed. From this, a minimum capacity results of:

$$G = (90 \text{ min.} * 4 * 2,000 \text{ DIN A4 pages/min.} * 4 \text{ MB}/$$
$$\text{DIN A4 page})/10$$
$$= 562.5 \text{ GB}.$$

According to this example, the print data cache memory requires a capacity of at least 565 GB. Since changing a paper roll typically can only be done given a printer at a standstill, print data may be loaded into the print data cache memory at this time (approximately 10-15 minutes).

This method is based on the awareness that print jobs may in large part by kept in the spooling storage cost-effectively, and a relatively small print data cache memory is sufficient in order to ensure the fast and continuous supply of the printing apparatus with print data. Since the print jobs may be kept in the spooling storage, they may be deleted from the print data cache memory without further measures if a print job with higher printing priority is present, without them being lost. However, the print jobs deleted from the print data cache memory remain in the spooling storage until the print jobs have been completely processed or been discarded by the user. Only the print data cache memory need be a fast cache memory medium. In comparison thereto, the spooling storage may be significantly slower than the print data cache memory with regard to the write and read speed, whereby a large capacity may be cost-effectively provided.

According to a development of the disclosure, print jobs at the print data cache memory may likewise be deleted if a print status of the print job indicates that the print job has been printed or terminated or has not been printed for a predetermined amount of time for further reasons. If one of these two print status types is present, the print job does not need to occupy capacity in the print data cache memory. The freed capacity may be used for print jobs that are actually being printed.

In an exemplary embodiment, given a plurality of print jobs that are potentially to be deleted, based on at least one of the following criteria, one print job of this plurality of print jobs that are potentially to be deleted is selected in order to delete it:

the print job has been paused,
the print job has the lowest printing priority of all print jobs in the print data cache memory,
the print job has the latest expected start of the printing processes,
the print job is the most recent of all print jobs loaded into the print data cache memory,
the print job is the largest of all print jobs in the print data cache memory,
the print job would require the longest time of all print jobs present in the print data cache memory in order to be printed,
the printing apparatus provided for the print job has been deactivated,
the printing apparatus provided for the print job has output an error, and/or
the printing apparatus provided for the print job is in a maintenance mode.

If a printing apparatus has been deactivated or been placed in maintenance mode, the print jobs stored in the print data cache memory are initially not required and might be deleted if needed. In an exemplary embodiment, upon starting or resuming the printing apparatus, the associated print data cache memory is checked for print jobs for this printing apparatus. New print jobs may then be loaded depending on the present capacity.

It may necessarily occur that, due to a change in the printing priority, a print job is loaded into the print data cache memory and a plurality of print jobs stored there are potential candidates for deletion. Since only a certain capacity must be freed, not all of these print jobs that can potentially be deleted inevitably need to be deleted. The aforementioned criteria are used in order to decide which print jobs should be deleted. They may also be prioritized in descending order.

Furthermore, the print server may be designed such that the print data cache memory has a write speed dependent on the read speed. The read and write speed may also be referred to as I/O performance. Conventional hard disks often have only one read/write head. Thus, they may either only be read or written to. The write process conventionally most often has the higher priority. Given a print server, however, it is important that the reading is not interrupted, because otherwise the supplying of a printing apparatus with print data might not be ensured. In the present disclosure, the write speed may be limited accordingly so that the write process does not block the read process. The write process for writing data into the print data cache memory may be controlled, depending on a read speed necessary for the respective printing apparatus or group of printing apparatuses, such that the speed of the write process of the spooling priority print job should be less than the difference of the read speed and write speed of the print data cache memory and the required read speed for relaying to the printing apparatus. The necessary read speed is often empirically known. However, in the individual instance it may also be determined in the print server using the present print jobs, in particular their amount of data per page, and the print speed of the respective printing apparatus. The read speed may be averaged over a plurality of print jobs, and/or the momentary read speed may also be used. By considering the momentary read speed, it may be ensured that the required read performance is provided even given temporary peak outputs.

For this, in an exemplary embodiment, the read and write speed of the print data cache memory and of the print data stream are checked at the printing apparatus at regular intervals. A differentiation is hereby made between an average read speed and a momentary read speed. The allowed average read speed is calculated from the difference of the read and write speed of the print data cache memory and the average required read speed for relaying to the printing apparatus. Given the momentary write speed, it is instead the current read speed of the printing apparatus that is required at this moment, which delimits the write speed. Temporary load peaks thereby also do not lead to bottlenecks in the read speed.

As a first alternative, the read speed may never be reduced. As a second alternative, insofar as the read speed for relaying to the printing apparatus is markedly greater than the actual required read speed, the read speed may be reduced in favor of the write process as long as it remains above a defined threshold. The threshold is greater than or equal to the required read speed. In an exemplary embodiment, the threshold is twice as fast, in particular ten times as fast, as the required read speed.

In an exemplary embodiment, the write speed is reduced if, according to the above criterion, sufficient read speed is not available.

Insofar as a plurality of printing apparatuses are connected, in an exemplary embodiment, the cache memory medium has a plurality of partitions, wherein a respective printing apparatus is associated with each of these print data cache memories. The print data cache memories do not need to be physical partitions. Logical ranges of the cache memory medium are possible.

In an exemplary embodiment, the print data cache memories are configured to be adapted to the respective situation. If only text in black-and-white is printed at a printing apparatus, then the print jobs and the necessary data rate are significantly smaller than given print jobs with numerous color images. The print data cache memory may then be adapted accordingly as needed. A plurality of physically different cache memory media may also be provided, wherein the individual print data cache memories may also comprise a plurality of logical ranges of different physical cache memory media. The physical properties, for example latency, write speed and/or read speed of the individual physical memories may thus be averaged for the respective partition.

A partition, or a property and/or a functionality of a partition, wherein the functionality describes the executable property of the partition, for example ensuring a defined capacity or a defined I/O performance, may be provided, generated, modified, and/or erased by the operating system and/or by corresponding software. The partitions may also be externally connected to the system, for example via a storage area network (abbreviated as SAN). Real or virtual storage media that may have partitions may be controlled via defined methods, for example iSCSI (internet Small Computer System Interface). Partitions may also be part of a logical drive of a RAID (redundant array of independent disks) system. The RAID system may be both a hardware and a software RAID.

Different printing apparatuses have different read speeds. For example, printing apparatuses may print five pages per second, fifty pages per second, or one hundred pages per second. For example, a printer that prints 50 pages per second thus requires a higher read speed than a printing apparatus which prints only five pages per minute. The page size is also decisive. For example, a printer that prints pages at 5 MB/DIN A4 page thus requires a higher read speed than a printing apparatus which prints pages only at 0.5 MB/DIN A4 page. The print data cache memory that is associated with the printing apparatus which requires a higher read speed accordingly empties more rapidly than the slower one. Inasmuch, it would be advantageous if the print data cache memories in the faster printing apparatus are larger and faster than in the slower printing apparatus.

It has been shown that the dependency of the required capacity of the print data cache memory is proportional to the print data stream. In the simplest instance, the proportionality may be linear. A printing apparatus printing twice as fast is thus linked with a print data cache memory that it twice as large.

An additional factor that has an influence on the size of the capacity is the paper length on the print roll in the printing apparatus. The more paper on the print roll, the more pages may be printed. A print roll is preferably printed without interruption. This means that all print jobs provided for the print roll are preferably presently stored in the print data cache memory. Given print rolls with a great deal of paper, a large print data cache memory is therefore necessary.

According to an exemplary embodiment of the disclosure, insofar as it has a plurality of print data cache memories having respectively different read and write speeds, the print server selects the print data cache memory based on one of the following rules:

the spooling priority print job is loaded into the print data cache memory having the most free capacity, the spooling priority print job is loaded, using its required read speed, onto the slowest print data cache memory which has the necessary read speed, the spooling priority print job is loaded into the print data cache memory on which similar print jobs are already stored, wherein the similarity is determined by the agreement of defined parameters, for example paper selection, the spooling priority print job having a predetermined failure significance is loaded into the print data cache memory that is associated with a printing apparatus which, due to its failure probability, is associated with a corresponding failure significance, and/or the spooling priority print job is loaded, with a parameter contained in the print job, into the print data cache memory that is associated with a printing apparatus which is associated with this parameter.

For each spooling priority print job, the print data cache memory that matches it is thereby selected. The required read speed is determined by the page size, thus the amount of data per page, of the print job and the speed of the printing apparatus. In an exemplary embodiment, a check is thereby to be made as to whether the total read speed is not exceeded by the print data cache memory during the anticipated printing process or print jobs.

Print jobs can be merged via the selection of a print data cache memory in which similar print jobs are already stored. This merging may, for example, occur on the basis of the paper type that is defined for these print jobs. The time between the printing of two print jobs may thus be shortened at a printing apparatus since the paper type does not need to be exchanged. In an exemplary embodiment, print jobs are also merged in the print data cache memory. The printing priority is hereby automatically modified so that similar print jobs are printed in direct succession. Alternatively, the printing priority may also be manually modified.

The loading of a spooling priority print job with a predetermined failure significance into the print data cache memory that is associated with a printing apparatus which, due to its failure probability, is associated with a corresponding failure significance has the advantage that the spoilage may be kept comparably small given a failure. For example, a sheet page printer may thus be stopped and later continue again given an unplanned, momentary stop. This is not so simply possible given roll printers, whereby an increased spoilage occurs. A failure significance may be associated with each print job, whereby the selection of the printing apparatuses—and therewith also the selection of the associated print data cache memories—is limited. For example, the failure of a printing process on simple paper is not as costly as the failure of print products on special paper that is coated, for example. For example, a failure significance that ensures that the print job is implemented at an extremely reliable printing apparatus is associated with a print job on special paper.

There is a similar behavior with the criterion that the spooling priority print job, with a parameter contained in the print job, is loaded into the print data cache memory that is associated with a printing apparatus which is associated with this parameter. The selection of the printing apparatuses, and therefore also the selection of the associated print data cache memories, is thereby limited for each print job. For example, print jobs that include color pages may be specifically directed to defined printing apparatuses.

In an exemplary embodiment, security-relevant spooling print data is loaded unencrypted exclusively to a volatile print data cache memory, for example a RAM storage. The volatile print data cache memory is characterized by a volatile storage. Security-relevant spooling print data are present exclusively in encrypted form in the spooling storage. The spooling storage is non-volatile. Upon decryption of these security-relevant spooling print data, they are loaded into the volatile print data cache memory. The advantage of volatile print data cache memories is that they store information only during operation. Given loss of the power supply, these data can no longer be found in the RAM storage. Given other systems, an active deletion and regular overwriting of the data blocks would be necessary, which, however, is not possible given a loss of the power supply.

In an embodiment according to the disclosure, two or more print servers may be networked with one another in order to exchange information about the respective capacity of the cache and, depending on availability, to execute at least one of the following actions:
  loading the spooling priority print job of a first print server into the print data cache memory of a second print server,
  printing a print job which is stored in the print data cache memory of the first print server at a printing apparatus which is connected to the second print server, or
  shifting print jobs from the print data cache memory of the first print server into the print data cache memory of the second print server.

If multiple print servers are used, given very high utilization of a printing system, the load may thus be reduced in that a second print server with printing apparatuses takes on print data from the first print server. The load is thereby distributed.

In an exemplary embodiment, a spooling priority print job is directed directly and immediately from a spooling storage to a printing apparatus. This is in particular reasonable when the print data cache memory is at capacity and the read speed of the spooling storage is sufficient for the print job.

In an alternative method for operating a print server for digital high-capacity printing systems, a print server is likewise used that has a spooling storage which is designed to store print jobs and a print data cache memory which is designed to transmit print data of a spooling print job to one or more printing apparatuses. The print data cache memory is subdivided into a plurality of sub-ranges, wherein a respective sub-range is associated with a printing apparatus, wherein at least a predetermined capacity of the sub-range remains continuously reserved for the associated printing apparatus. This predetermined capacity is referred to in the following as a capacity reserve. This means that this memory capacity may not be utilized by other printing apparatuses.

If a printing apparatus is deactivated, the capacity of the sub-range associated therewith may be provided, except for the capacity reserve, to other sub-ranges of other printing apparatuses. Upon reactivation of the deactivated printing apparatus, the reserved capacity is therefore immediately available to it. The printing process may hereby begin without delay.

In an exemplary embodiment, the capacity of the sub-range is calculated as a portion of the total capacity of the print data cache memory, by means of a sub-range factor. The capacity of the sub-range corresponds to the total capacity of the print data cache memory, multiplied by the respective sub-range factor. In an exemplary embodiment, the sub-range factor is between zero and one, and the sum of all sub-range factors of a print data cache memory yields one. In an exemplary embodiment, the sub-range factor is set using one or more of the following rules:
  the sub-range factor is greater than 0.05, preferably greater than 0.1, and in particular is greater than 0.15, so that the capacity reserve is present,
  the sub-range factor is inversely proportional to the number of sub-ranges,
  the sub-range factor is proportional to the read speed of the associated printing apparatus,
  the sub-range factor is proportional to the size and/or number of the spooling print jobs that are provided for the printer associated with the sub-range,
  the sub-range factor is associated in a predetermined manner with the properties of the spooling print jobs that are provided for the printer associated with the sub-range,
  the sub-range factor is greater than a predetermined value, and/or
  the sub-range factor is a manually set value.

The sub-range factor may thus be set and adapted automatically and/or manually during operation. Ranges of the print data cache memory thereby do not go unutilized. The capacity of the print data cache memory may thereby be optimally utilized. The size of the print data cache memory that is required for operation is hereby reduced.

The sub-range factor is preferably adapted to a defined time of day, or according to:
  a defined time period,
  the printing of a print file, or of a defined number of print files,
  the change of a printing type, wherein the printing type refers to groups of print jobs having similar printing properties, for example the printing of invoices, and/or
  an activation of deactivation of a printing apparatus which is connected to the print server.

Unforeseen events, such as performance peaks, may also be reacted to via the adaptation of the sub-range factor via defined triggers.

In an exemplary embodiment, the sub-range factor is regulated using the time curve of one or more of the following parameters:
  size of the print jobs in the sub-range,
  number of print jobs in the sub-range,
  print type of the print jobs in the sub-range, and/or
  the free capacity of the sub-range and/or of the other sub-ranges.

Via the regulation of the sub-range factor, the adaptation may react to a time curve. For example, increasing print job counts may be better reacted to. Such increasing print job counts occur, for example, given an increased number of invoices at the end of the month.

This alternative method may also be executed without the method described above. In order to optimally utilize the capacity, both methods may also be used together.

A print server according to the disclosure for digital high-capacity printing, with which print jobs are received, comprises a CPU, a storage unit, a spooling storage, and a cache memory medium which has at least one print data cache memory, wherein the print server is designed to execute the method explained above. This may be realized for this purpose with a suitable computer program. In an exemplary embodiment, the print server includes processor circuitry that is configured to perform one or more functions and/or operations of the print server.

The present disclosure is particularly suitable for application in a print server. However, the changing of printing priorities may be outsourced to other computer systems, wherein the printing priority changes are relayed to the print server.

In an exemplary embodiment, the capacity of the spooling storage is greater than the combined capacity of all print data cache memories. In particular, the capacity is multiple times greater, at least twice, preferably at least five times, and if possible at least two times. Print jobs that were also deleted in the print data cache memory may thereby be kept available in the spooling storage so that, as soon as sufficient capacity is present again in the print data cache memory, the print jobs may be reloaded into the print data cache memory.

In an exemplary embodiment, the read and write speed of the print data cache memory is greater than the read and write speed of the spooling storage. In particular, the read and write speed is multiple times faster, at least twice, preferably at least five times, and if possible at least ten times faster. The primary object of the print data cache memory is to ensure that a printing apparatus may read the print data to be printed at any time. Given certain printing apparatuses, this read speed may be very high. Add to this that, in addition to this read process, print data are loaded into the print data cache memory while other print data are being printed. A high read and write speed of the print data cache memory is thus important in order to avoid a downtime, and thus high costs with the printing apparatus. The read and write speed of the spooling storage is therefore comparably low. Typical read speeds result from the page size and the speed of the printing apparatus. A first example is calculated from 2200 DIN A4 pages per minute with 2 MB per DIN A4 page, whereby 73.3 MB/s results. A second example is calculated from 3200 DIN A4 pages per minute with 4 MB per DIN A4 page, whereby 213.3 MB/s results.

Insofar as the read and write speed of the spooling storage is sufficient, some print jobs may preferably also be routed directly from the spooling storage to the printing apparatus. The spooling storage then likewise acts as a print data cache memory.

In an exemplary embodiment, the read and write speed of the print data cache memory $V_{LS}$ is calculated from a weighted sum of the print speeds $\Sigma(V_D)$ of all associated printing apparatuses. For example, the sum may be weighted by the average size $|K_D|$ of the print jobs for the respective printer and a standard size $K_S$. The standard size $K_S$ is predetermined and is 1 MB, for example. In this example, the read and write speed of the print data cache memory $V_{LS}$ is twice as fast as the product of the sum of the print speeds $\Sigma(V_D)$ of all associated printing apparatuses and the average size $|K_D|$ of the print jobs for the respective printer, divided by the standard size $K_S$. The corresponding formula is:

$$V_{LS}=2*/(V_D)*|K_D|/K_S.$$

The higher the print speeds $V_D$, the higher that the read and write speed of the print data cache memory $V_{LS}$ must be. Albeit, if the average size $|K_D|$ of the print jobs is above the standard size $K_S$, the read and write speed must be increased.

Alternatively, the sum of the print speeds $V_D$ of all associated printing apparatuses might be determined by the frequency of the print jobs. This means that, when a comparably large amount of time elapses between the individual print jobs, the demand for the read speed is also lower.

However, the read and write speed of the print data cache memory $V_{LS}$ might also be predetermined via a maximum utilization. Given the maximum utilization, a maximum size $K_{D,max}$ of the print jobs is chosen instead of the average size $|K_D|$ of the print jobs. Other weightings are likewise conceivable.

In an exemplary embodiment, the cache memory medium has a plurality of storage media respectively having different read and write speeds. For example, these may be a hard drive, SSD, or RAM storage media. In an exemplary embodiment, the cache memory medium hereby has a plurality of logical ranges. As has already been mentioned above, the logical ranges are not necessarily physical partitions, although they can be.

Printing apparatuses having different read speed requirements may thereby be operated. Depending on the read speed requirement, print jobs may thus also be loaded into the corresponding print data cache memories that satisfy the requirements.

The disclosure is explained in detail in the following using a printing system 1. The printing system 1 has a print server 2 (FIG. 1) to which a plurality of printing apparatuses 3 are connected via a respective data line 4. The data line 4 normally corresponds to a network standard, for example Ethernet.

The print server 2 is connected to a network (LAN or WAN), and in particular with the Internet 5, to which are connected one or more clients 6 at which print jobs are generated and transmitted to said print server 2 via the Internet 5.

The print server 2 receives the print jobs and relays them to the respective printing apparatuses 3. The print jobs are cached in the print server 2, processed as necessary so that they may be received from the print server 2, rastered at the printing apparatus 3, and printed out. At the print server, an operator also has the capability of viewing the print jobs, for example with what is known as a preview program, wherein he may check individual pages and affect the relaying and processing of the print jobs at the print server. In an exemplary embodiment, the print server 2 includes processor circuitry that is configured to perform one or more functions/operations of the print server 2.

Such print servers which relay print data to one or more printing apparatuses are typically used in high-capacity printing. What is understood as high-capacity printing in the sense of the present disclosure is the use of a printing apparatus that may print to at least 5 pages of DIN A4 size per second. However, printing apparatuses for high-capacity printing may also be designed for higher printing speeds, for example at least 30 pages of DIN A4 per second, and in particular at least 50 pages DIN A4 per second, and preferably at least 90 pages of DIN A4 per second. The printing apparatuses are digital printing apparatuses, meaning that print data are transmitted to them in digital form, which print data are translated at a print head in the printing apparatus 3 into a print image that is applied onto a recording medium, which is often paper, by means of a print color. Such a printing apparatus is typically designed as an inkjet printing apparatus or as an electrophotographic printing apparatus. It may also be a printing apparatus whose print color is liquid toner.

Empirically, the amount of data of a color page of DIN A4 size in the Portable Document Format, abbreviated as PDF, is on average approximately 0.5 to 2 MB. Given an amount of data of 2 MB per page and a printing speed of 50 pages per second, this means that a print data stream of 100 MB/sec is supplied to the printing apparatus. Given high-resolution color printing, and in particular given printing and/or given documents in which a plurality of images are fixed, the data amount per DIN A4 page may be 10 to 25 MB, and in the extreme instance up to 600 MB.

Therefore, the print server 2 may receive a significant data stream and assign the data contained therein—and possibly adapt them—to the individual printing apparatuses 3. Such an adaptation may include a changing of the format of the print data stream (IPDS, PCL, PDF etc.), a scaling of the print data, a changing of the resolution of the print data, or another adaptation of the print data to the requirements of the respective printing apparatus, or to special requirements of the operator of the printing apparatus or of a customer of a print job.

The storage structure of the print server 2 (FIG. 2) comprises a spooler 8 having at least two hard drives 9, 10, wherein the one hard drive 9 is a conventional mass storage (which is why this hard drive is designated as an M-hard drive 9 in the following) which serves for the storage of print data (PD), and the other hard drive is formed from cache memory, which is why it is designated as a cache memory medium 10.

The print server 2 has an additional hard drive 11 which serves to accommodate the operating system, application programs, control data, and trace data. This hard drive is designated in the following as a system hard drive 11.

The print data generated at the client 6 are transmitted via the Internet 5 to the print server 2, and there are initially stored on the M-hard drive 9.

The print data are converted into ready-to-print print data, wherein they hereby continue to be held on the M-hard drive 9. The finished converted ready-to-print print data are transferred to the cache memory medium 10. As has been explained above, the cache memory medium 10 is a cache memory to which the data may be quickly written and from which the data may be quickly read. The ready-to-print print data may hereby be supplied quickly to the printing apparatus 3.

Both the print data and the ready-to-print print data are subdivided into individual print jobs. A print job may include one or more files.

The spooler 8 is characterized in that print jobs stored on the cache hard drive 10 may be deleted again in order to free up storage space for print jobs having a higher priority. This is explained in detail below. It is hereby possible to design the capacity of the cache memory medium 10 to be relatively small, and in spite of this to provide a continuous print data stream to the connected printing apparatuses 3.

Figure 2:
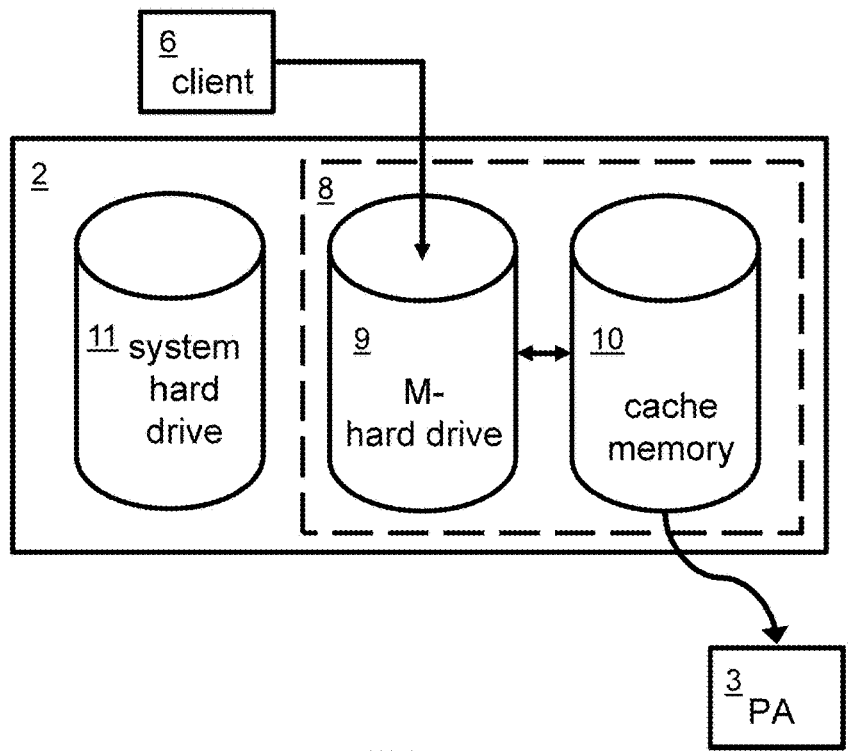
FIG. 2 illustrates a storage structure of the print server, with a spooler, according to an exemplary embodiment of the disclosure.

The M-hard drive 9, the cache hard drive 10, and the system hard drive 11 are depicted as separate hard drives in FIG. 2. In principle, it is also possible that these hard drives merely form separate partitions on a single hard drive. Here, the term "partition" is used in the sense of a logical hard drive.

By contrast, the M-hard drive 9 and the cache memory medium 10 of the spooler 8 are at least two separate hardware elements. The cache memory medium 10 is formed from a cache memory, while the M-hard drive 9 can be a conventional mass storage medium that does not represent a cache memory. A cache memory in the sense of the present disclosure is a mass storage having a faster write and read speed than the M-hard drive 9. Therefore, the cache memory or the cache memory medium 10 may also be a conventional, fast hard drive with a magnetic disc (HDD). However, faster mass storage media are preferred, in particular semiconductor storage, for example an SSD, a flash memory, and/or a RAM disk. As is explained in further detail below, the cache memory may also include a plurality of different mass storage media in combination.

Figure 4:
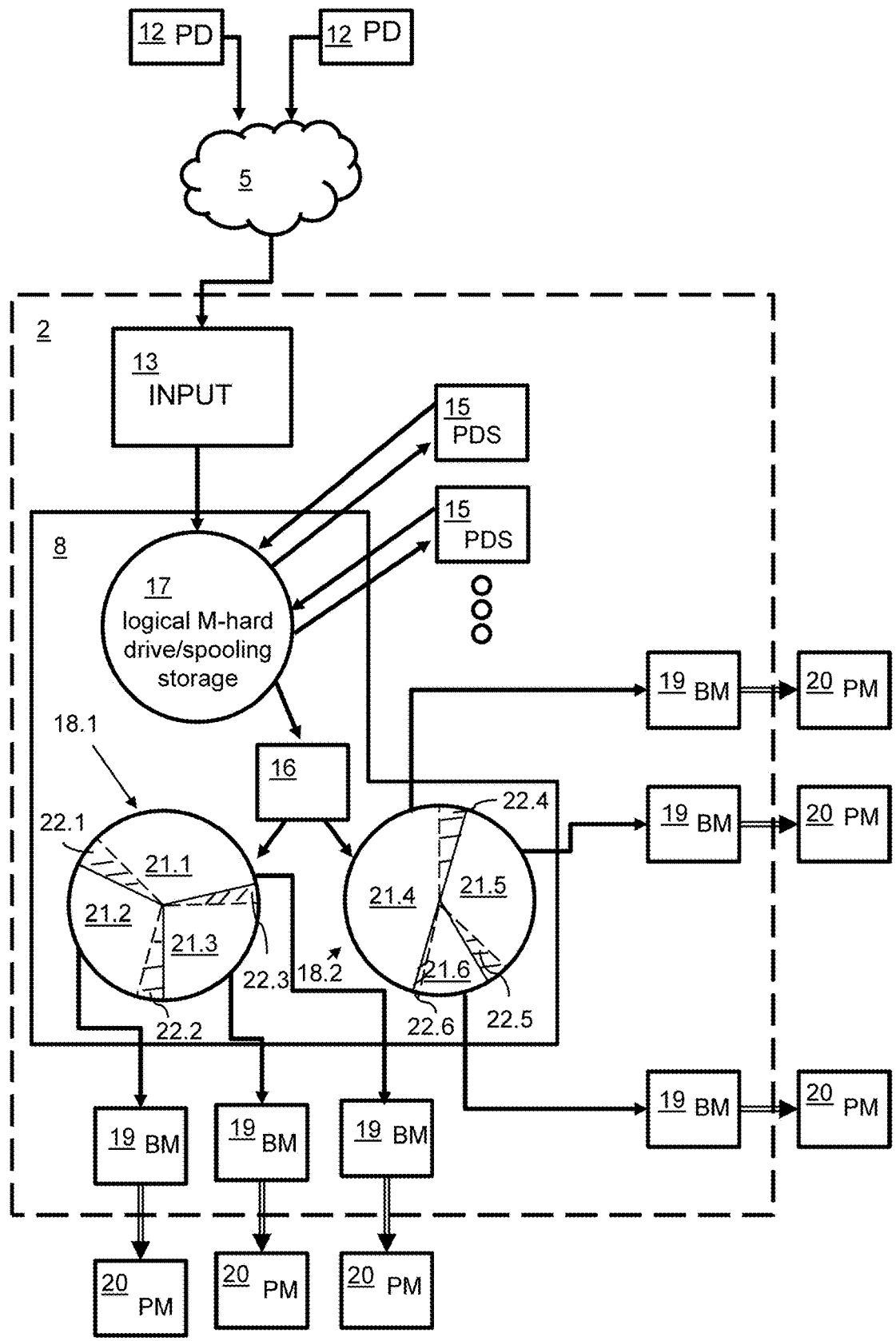
FIG. 4 illustrates software modules, logical data connections, and logical storage units for execution of a method according to an exemplary embodiment of the disclosure.

In the following, the logical elements of the print server 1, meaning the software modules, logical data connections, and logical storage units, are explained in detail using FIG. 4. The print jobs are generated at print data generation programs 12 which are executed at the client 6 and transmitted via the Internet 5 to an input module 13 of the print server 2. The input module 13 writes the print jobs to a logical M-hard drive 17, which is the logical counterpart to the M-hard drive 9 and a component of the spooler 8. The logical M hard drive 17 is referred to in the following as spooling storage 17. Print data services 15 read the print job from the spooling storage 17 and process it. After processing, the print data services 15 write the print job to the spooling storage 17 again. Via the processing by means of one or more such print data services, the print jobs arriving at the print server 2 are converted into print jobs which represent ready-to-print print data and thus may be printed immediately by the printing apparatuses 3. These print jobs converted in such a manner are designated as R2P print jobs in the following.

These ready-to-print print jobs are transmitted by a spooler module 16 to one or more logical print data cache memories 18.1/18.2 according to predetermined rules. Each of these print data cache memories 18 is subdivided again into sub-ranges 21. A backend module 19 is associated with each sub-range 21, which backend module 19 reads the print jobs from the respective sub-range 21 and transmits them to a print module 20 of the respective printing apparatus 3. In the present exemplary embodiment, all print jobs arriving at the spooler are initially stored in the spooling storage 17. The print jobs may be associated with a specific one of the printing apparatuses 3 or, if this is not the case, the print jobs are then associated by the spooler module 16 with one of the printing apparatuses 3 using their properties. Print jobs having many color images are preferably associated with a high-capacity color printer, while black-and-white forms are preferably associated with a special form printer. This association may be with one of the printing apparatuses 3 according to a plurality of different parameters such as size of the print job, color proportion, resolution of the print image and the like.

If a print job is associated with a specific printing apparatus 3, the spooler module 16 then attempts to write the print job to the sub-ranges 21 of the print data cache memory 18 that is associated with the respective printing apparatus 3 via one of the backend modules 19.

Figure 5:
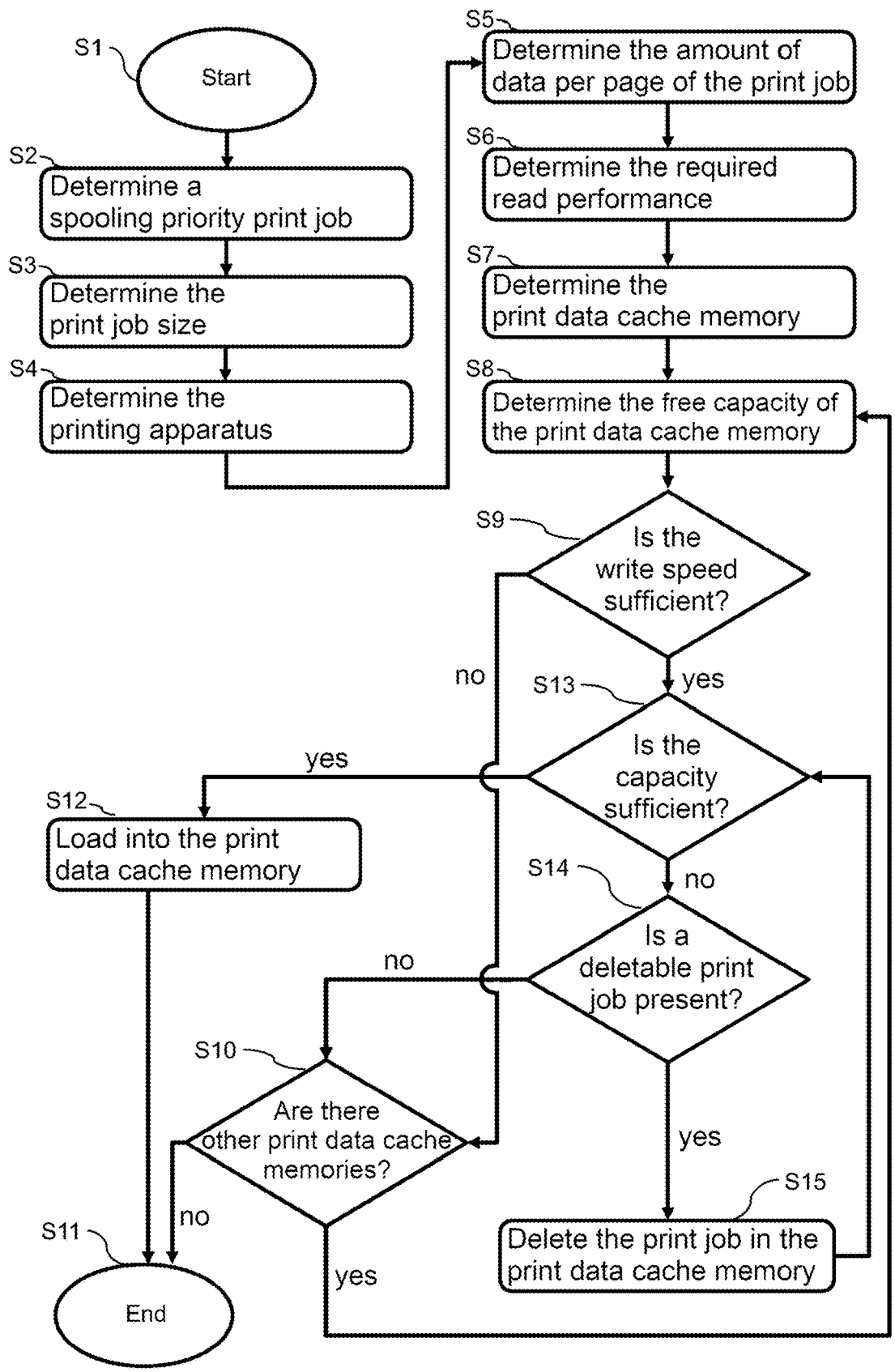
FIG. 5 illustrates a flowchart of a method for controlling the spooling units (e.g. of FIGS. 2-3) according to an exemplary embodiment.

If a print job state changes, a method is executed to load one of the print jobs from the spooling storage 17 into one of the print data cache memories 18. This loading method is depicted in FIG. 5 and begins with step S1. Step S1 is executed via an interrupt upon a print job state change. For example, a print job state change arises if the spooler 8 has received a new print job and this has been written to the spooling storage 17, or if the priority of the print job changes. Furthermore, this interrupt occurs if a printing apparatus has completed printing of a print job, wherein a print file in the print data cache memory is then deleted.

All print jobs stored in the spooling storage are referred to as spooling print jobs. A respective printing priority is associated with these spooling print jobs. The printing priority determines what precedence a print job has in order to be printed out at the printing apparatus associated with it.

A spooling priority print job is determined in step S2. This is the spooling print job that has the highest priority and is not yet stored in the print data cache memory 18.

The print job size of the spooling priority print job is determined (step S3).

The printing apparatus 3 is subsequently determined in step S4.

The data amount per page of the print job is determined in step S5.

A read performance of the printing apparatus 3 is then determined (step S6). The read performance results from the data amount per page of the print job and the print speed of the printing apparatus 3.

The print data cache memory 18 is subsequently selected (step S7). If a plurality of print data cache memories 18 are present, one of these print data cache memories 18 is initially selected.

The free capacity of the print data cache memory 18 is determined into which the spooling priority print job should be loaded in order to be able to be transmitted to the corresponding printing apparatus 3 (step S8).

It is subsequently examined whether the write speed of the print data cache memory 18 is sufficient in order to transmit the print data to the printing apparatus 3 quickly enough (step S9). The write speed should be higher than the read performance that was determined in step S6.

If this is not present, a check is made as to whether another print data cache memory 18 is available (step S10). If another print data cache memory 18 is then available, step 8 is repeated.

If there is no other print data cache memory 18, the method is ended in step S11.

If it is determined in step 8 that the write speed is sufficient, it is then assessed whether the free capacity of the print data cache memory 18 is sufficient in order to write the spooling priority print job to the corresponding print data cache memory 18 (step S13). If this is the case, the method workflow then transitions to step S12, in which the spooler module 16 reads the spooling priority print job from the spooling storage 17 and writes it into the print data cache memory 18. The spooling priority print job is thus loaded into the print data cache memory 18.

The method is then ended in step S11.

If, by contrast, it is established in step S13 that the free capacity of the desired print data cache memory 18 is not sufficient in order to write the spooling priority print job completely into the print data cache memory 18, the method workflow transitions to step S14, in which it is determined whether a deletable print job is present in print data cache memory 18. A deletable print job in the print data cache memory 18 is a print job whose priority is lower than the priority of the spooling priority print job and that is not yet being printed. Not yet being printed means that the corresponding backend module 19 has not yet begun to transfer this print job to the corresponding printing apparatus 3.

If a deletable print job is established, then in step S15 this print job is deleted in the print data cache memory 18 in order to free up capacity for the spooling priority print job. The method workflow then transitions to step S13 again, in which it is checked again whether the capacity of the print data cache memory 18 is now sufficient to store the spooling priority print job.

By contrast, should it be established in step S14 that no deletable print job is present in the print data cache memory, step S10 is executed.

The print jobs in the spooling storage 17 are not deleted upon loading the print jobs from the spooling storage 17 into the sub-range 21 of the print data cache memory 18. Therefore, the corresponding print jobs in the spooling storage 17 are present as before in the event that they are deleted in the print data cache memory 18 in step 19. They may then be loaded again from the spooling storage 17 into the print data cache memory 18 at a later point in time.

The capacity of a sub-range 21 may be modified during operation, meaning before, during, and after a printing process. An increase of the capacity of a first sub-range 21/1 leads to a reduction of at least one other sub-range 21/2 and/or 21/3.

Furthermore, a certain capacity, which is designated as a capacity reserve 22 in the following, may be reserved. That means that the capacity of a sub-range 21/1 may not fall below a certain value which corresponds to the capacity reserve 22.

If a printing apparatus 3 is switched off or decoupled in the printing system 1, the capacity of the sub-range 21/1 which is associated with this printing apparatus 3/1 may thus be reduced except for the capacity reserve 22/1. More capacity is thus available to the other sub-ranges 21/2 and/or 21/3.

If the printing apparatus 3 resumes operation or is reconnected, the capacity reserve 22/1 is thus immediately available to the associated sub-range 22/1. Print data may thus be loaded into the sub-range 21/2 independently of whether the printing apparatus is operating or not.

Multiple versions of the print jobs may also be present, stored in the spooling storage 17. The print jobs are directed from the print data generation module 12, via the input module 13, into the spooling storage 17. As described above, they are processed by print data services 15. After each processing step, the newest version of the print jobs is stored in the spooling storage 17. Depending on the present processing step, the older version may be deleted. However, it may also be advantageous to not delete specific versions of the print jobs, for example the unprocessed version. It may also be advantageous to not delete intermediate versions of the print jobs if a print job is provided for different printing apparatuses, and thus different ready-to-print print jobs result. The print jobs may also be stored encrypted in the spooling storage 17. This is explained in detail below.

In the spooling storage 17, the print jobs are only deleted if they have been entirely transmitted from the print data cache memory 18 to the respective printing apparatus 3. The method explained above for loading print jobs from the spooling storage 17 into the sub-range 21 of the print data cache memory 18 is invoked with an interrupt upon a print job state change. For example, such a print job state change is present if the spooler 8 has received a new print job. However, such a print job state change is also present if a print job in the print data cache memory 18 has been completely transferred to the corresponding printing apparatus 3 and this print job is deleted both in the sub-range 21 of the print data cache memory 18 and in the spooling storage 17. A print job state change thus occurs upon every deletion of a print job in the spooling storage 17 and/or in the sub-range 21 of the print data cache memory 18, and upon writing a print job to the spooling storage 17. The loading of a print job from the spooling storage 17 into the sub-range 21 of the print data cache memory 18 does not represent a print job state change.

Alternatively, print jobs may be held at the spooling storage 17 for a predetermined time period after printing before they are automatically deleted.

An additional possibility would be that print jobs are kept at the spooling storage 17 after printing before they are manually deleted.

Given the method explained above, print jobs newly received at the print server 2 are always written to the spooling storage 17 first. A copy of the print job is hereby always present in the spooling storage 17, even should it be deleted in the sub-range 21 of the print data cache memory 18 before it has been printed.

The printing priority indicates with what precedence a print job should be printed out at the printing apparatus associated with it. This precedence or this printing priority may depend on different parameters. "Old" print jobs normally have precedence over "younger" print jobs. The age of the print jobs may hereby be determined using the creation date of the respective print job and/or the arrival at the print server 2, in particular at the spooler 8. A combination of the age of the print job based on its generation and the arrival at the print server or at the spooler may also be used. The printing priority may also be modified or set manually by a user, both at the client and at the print server. The printing priority may also be influenced by a delivery date before which the print good to be generated with the print job should be delivered. The print server and/or a user may also influence the printing priority in order to optimally efficiently sort the order of the execution of the print jobs. For example, print jobs which should be printed on a paper with the same quality may be sorted one after another by means of the printing priority so that no paper changes, or only a few paper changes, are to take place at the printing apparatus 3 between individual print jobs.

In the above exemplary embodiment, the printing priority indicates the precedence of a print job at the printing apparatus associated with it. This means that the printing priority applies for a specific printing apparatus. However, within the scope of the disclosure it is also possible to use a printing priority which is independent of the printing apparatus. This has the advantage that the printing priorities for all print jobs may be established with a rule set. However, it is hereby disadvantageous that requirements that are specific to a printing application cannot affect the printing priority. Therefore, whether the printing priority is formed specific to a printing apparatus or independently of the printing apparatuses depends on the circumstances.

Figure 3:
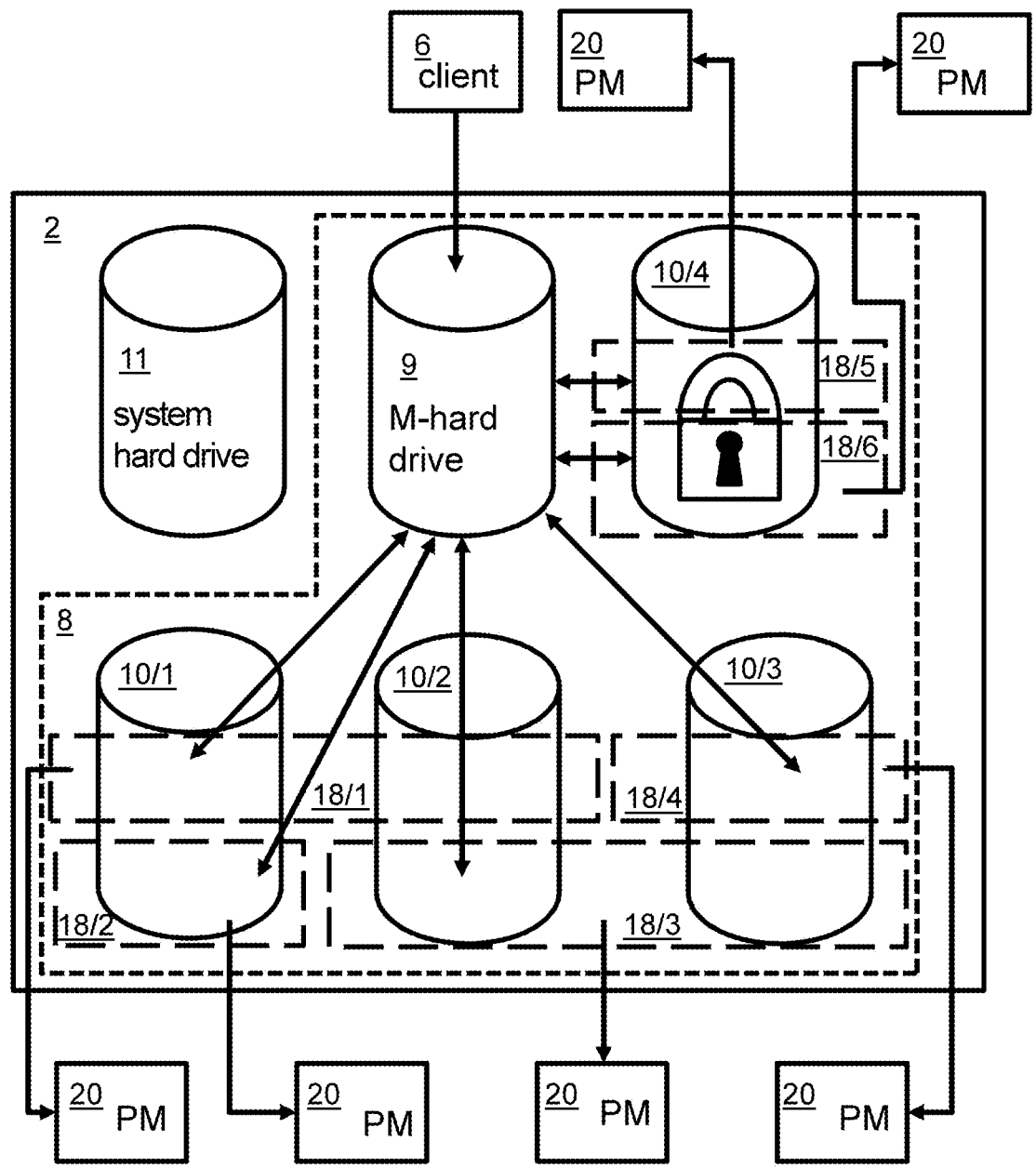
FIG. 3 illustrates a storage structure of a print server according to a further exemplary embodiment, with a spooler, according to an exemplary embodiment of the disclosure.

A second exemplary embodiment of the print server 2 or of the spooler 8 is explained in detail in the following (FIG. 3). In the second exemplary embodiment, identical parts are provided with the same reference characters. In the event that nothing to the contrary is said in the following, the above explanations similarly apply to the corresponding elements.

The second exemplary embodiment of the print server 2 again has an M-hard drive 9 and a system hard drive 11. The M-hard drive 9 is a component of a spooler 8 which has a plurality of cache memory media 10/1-10/4. The cache memory medium 10/1 is a fast magnetic disc hard drive (HDD), the cache memory media 10/2, 10/3 are respective SSD hard drives, and the cache memory medium 10/4 is a RAM disk. The print data cache memories 18 are respectively associated with defined segments of one of the cache memory media 10, wherein it is also possible that a print data cache memory 18 comprises portions of two or more different cache memory media 10. A print data cache memory 18 may hereby be provided whose properties with regard to storage capacity, write or read speed, and latency may have an average value of the corresponding parameters of the different cache memory media 10 across which the print data cache memories 18 is extended. In the present exemplary embodiment, six different print data cache memories 18/1-18/6 are provided, wherein the print data cache memories 18/1 and 18/3 respectively extend across different cache memory media 10. Each print data cache memory is connected to one of the printing apparatuses 3 via a backend module 19.

The sensitive print jobs are transmitted, encrypted by the client 6, to the print server 2 and stored in encrypted form on the M-hard drive 9. Upon conversion of the print data by the print data services 15, the print jobs are decrypted in a volatile cache, converted, encrypted, and stored again in encrypted form on the M-hard drive.

Since the cache memory medium 10/4 is designed as a RAM disk, it is a volatile hard drive storage. Ready-to-print print jobs in the cache memory medium 10/4 are always decrypted so that they may be printed directly by the corresponding printing apparatus 3. Print jobs which contain sensitive data are written exclusively into the volatile cache memory medium 10/4 so that, in the event of a technical problem, the decrypted data of the sensitive print job do not continue to be held on the cache memory medium 10/4 and might be read by unauthorized persons.

The cache memory medium 10/1 is a magnetic disk hard drive (HDD) having a single read/write head. This hard drive may hereby be either written to or read. It is not possible to simultaneously write to and read data from the hard drive. Given conventional uses of hard drives, the writing takes priority before the reading. Since, given a print server, the print data stream from the print server to the printing apparatus may not be interrupted, in the present application the reading by contrast has priority over the writing. In the print server, a write process for this hard drive, which has only a single read/write head that may limit the data stream, should be written to the hard drive to a defined maximum value. Factors that determine this upper limit are, among other things: read and write speed of the print data cache memory 18, the momentary performance of the print data cache memory 18, other write and read processes, and a safety buffer. It is hereby ensured that the read/write head is also always available for reading the data from the hard drive, within a predetermined scope. A predetermined read data stream is thus ensured in order to be able to reliably transfer the print data from the print server 2 to the printing apparatus 3.

In the exemplary embodiments described above, the M-hard drive 9 and the cache memory medium 10 are a physical hard drive. In other exemplary embodiments, however, they may also be present as logical hard drives. The spooling storage 17 and the print data cache memory 18 then form an additional level of logical hard drives.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing system
2 print server
3 printing apparatus
4 data line
5 Internet
6 client
8 spooler
9 M-hard drive
10 cache memory medium
11 system hard drive
12 print data generation module
13 input module
15 print data service
16 spooler module
17 logical M-hard drive/spooling storage
18 logical cache memory medium/print data cache memory
19 backend module
20 print module
21 sub-range
22 capacity reserve

The invention claimed is:

1. A method for operating a print server for digital high-capacity printing systems, the print server including a spooling storage configured to store print jobs, wherein, associated with each print job stored on the spooling storage, which are respectively referred to as spooling print jobs, are a printing priority and a print data cache memory configured to transmit print data of a spooling print job to one or more printing apparatuses, the method comprising:
    determining a spooling priority print job having a highest printing priority among the spooling print jobs and having not yet been stored in the print data cache memory;
    determining a print job size of the spooling priority print job;
    determining a free capacity of the print data cache memory;
    deleting one or more print jobs not currently being printed from the print data cache memory in response to the free capacity of the print data cache memory being less than the size of the spooling priority print job, wherein a printing priority of the one or more print jobs to be deleted is lower than a printing priority of the spooling priority print job; and
    loading the spooling priority print job into the print data cache memory in response to the free capacity of the print data cache memory being equal to or greater than the size of the spooling priority print job.

2. The method according to claim 1, wherein the one or more print jobs in the print data cache memory are deleted if the respective one or more print jobs has been completely printed or has been terminated.

3. The method according to claim 1, wherein, given a plurality of deletable print jobs, a print job of the one or more print jobs is deleted based on the following criteria:
    the print job has been paused,
    the print job has a lowest printing priority of all print jobs in the print data cache memory,
    the print job has a latest expected beginning of a printing process, the print job is a most recent of all print jobs to have been loaded into the print data cache memory, the print job is a largest of all print jobs in the print data cache memory, of all print jobs present in the print data cache memory, the print job requires a longest duration to be printed, the print job is to be printed at a printing apparatus that is deactivated, the print job is to be printed at a printing apparatus having output an error, and/or the print job is to be printed at a printing apparatus that is in a service mode.

4. The method according to claim 1, wherein, the print data cache memory has a write speed dependent on a read speed, a speed of a loading process of the spooling priority print job being less than a difference of the read and write speed of the print data cache memory and a required read speed for relaying to the printing apparatus.

5. The method according to claim 1, wherein a plurality of printing apparatuses are connected, the print server having a plurality of print data cache memories that are respectively associated with the printing apparatuses, and wherein capacities of the plurality of print data cache memories are automatically adapted depending on respective read speeds of the associated printing apparatuses.

6. The method according to claim 1, wherein the print server includes a plurality of print data cache memories having respective different read and write speeds, the print server being configured to select the print data cache memory from the plurality of print data cache memories based on one of the following:

the spooling priority print job is loaded into the print data cache memory of the plurality of print data cache memories having a most free capacity, the spooling priority print job is loaded, using its required read speed, onto a slowest print data cache memory of the plurality of print data cache memories having a necessary read speed, the spooling priority print job is loaded into the print data cache memory of the plurality of print data cache memories on which similar print jobs are already stored, wherein a similarity is determined by an agreement of defined parameters, the spooling priority print job having a predetermined failure significance is loaded into the print data cache memory of the plurality of print data cache memories associated with a printing apparatus which, due to its failure probability, is associated with a corresponding failure significance, and/or the spooling priority print job is loaded, with a parameter contained in the print job, into the print data cache memory of the plurality of print data cache memories associated with a printing apparatus which is associated with the parameter contained in the print job.

7. The method according to claim 1, wherein security-relevant spooling print data is loaded, unencrypted, exclusively into a volatile print data cache memory.

8. The method according to claim 1, wherein the print server is connected to one or more other print servers via a network to exchange information about respective capacity of the print data cache memories, and depending on availability, at least one of the following actions is executed:

loading the spooling priority print job of the print server into the print data cache memory of the one or more other print servers, printing at least one of the print jobs stored in the print data cache memory of the print server at a printing apparatus connected to the one or more other print server, and shifting print jobs from the print data cache memory of the print server into a print data cache memory of the one or more other print servers.

9. The method according to claim 1, wherein a spooling priority print job is relayed directly and immediately from a spooling storage to a printing apparatus.

10. The method according to claim 1, wherein the print data cache memory is subdivided into a plurality of sub-ranges, a respective sub-range of the plurality of sub-ranges being associated with a printing apparatus, and wherein at least a predetermined capacity of the sub-range remains permanently reserved for the associated printing apparatus.

11. The method according to claim 10, wherein:

a capacity of the sub-range corresponds to a product of a total capacity of the print data cache memory and a sub-range factor having a value between zero and one, a sum of all sub-range factors of a print data cache memory being equal to one, and the sub-range factor is set using one or more of the following rules:

the sub-range factor is greater than 0.15, the sub-range factor is inversely proportional to a number of sub-ranges, the sub-range factor is proportional to a read speed of the associated printing apparatus, the sub-range factor is proportional to a size and/or a number of the spooling print jobs that are provided for the printing apparatus associated with the sub-range, the sub-range factor is associated in a predetermined manner with properties of the spooling print jobs that are provided for the printing apparatus associated with the sub-range, the sub-range factor is greater than a predetermined value, and/or the sub-range factor is a manually set value.

12. The method according to claim 11, wherein the sub-range factor is adapted to a defined time of day or according to:

a defined time period, a printing of a print file of a defined number of print files, a changing of the print type, wherein the print type is corresponds to print jobs having similar printing properties, and/or an activation or a deactivation of a printing apparatus connected to the print server.

13. The method according to claim 11, wherein the sub-range factor is regulated using a time curve of one or more of the following parameters:

a size of print jobs in the sub-range, a number of the print jobs in the sub-range, a print type of the print jobs in the sub-range, and/or a free capacity of the sub-range and/or of the other sub-ranges.

14. A non-transitory computer-readable storage medium with an executable program stored thereon, wherein, when executed, the program instructs a processor to perform the method of claim 1.

15. A print server for digital high-capacity printing systems with which print jobs are received, comprising:

a memory that stores a computer program;

a spooling storage configured to store the received print jobs;

a cache memory medium having at least one print data cache memory configured to transmit print data of a spooling print job to one or more printing apparatuses, wherein, associated with each print job stored on the spooling storage, which are respectively referred to as spooling print jobs, are a printing priority and a print data cache memory of the at least one print data cache memory; and a processor that is configured to execute the computer program to:

determine a spooling priority print job having a highest printing priority among the spooling print jobs and having not yet been stored in the print data cache memory;

determine a print job size of the spooling priority print job;

determine a free capacity of the print data cache memory;

delete one or more print jobs not currently being printed from the print data cache memory in response to the free capacity of the print data cache memory being less than the size of the spooling priority print job, wherein a printing priority of the one or more print jobs to be deleted is lower than a printing priority of the spooling priority print job; and load the spooling priority print job into the print data cache memory in response to the free capacity of the print data cache memory being equal to or greater than the size of the spooling priority print job.

16. The print server according to claim 15, wherein a total capacity of the spooling storage is greater than a capacity of the print data cache memory.

17. The print server according to claim 16, wherein read and write speeds of the print data cache memory are faster than read and write speeds of the spooling storage.

18. The print server according to claim 16, wherein read and write speeds of the print data cache memory are twice as fast as a product of a sum of printing speeds of all associated printing apparatuses and an average capacity of the print jobs for the respective printing apparatus.

19. The print server according to claim 16, wherein the print data cache memory includes a plurality of storage media respectively having different read and write speeds.

\* \* \* \* \*